United States Patent [19]
Reppert

[11] 3,993,357
[45] Nov. 23, 1976

[54] WIRE WHEEL
[75] Inventor: Merlyn R. Reppert, Torrance, Calif.
[73] Assignee: W. R. Grace & Co., Columbia, Md.
[22] Filed: Mar. 20, 1975
[21] Appl. No.: 560,409

Related U.S. Application Data
[63] Continuation-in-part of Ser. No. 519,096, Oct. 30, 1974, abandoned, and Ser. No. 521,705, Nov. 7, 1974.

[52] U.S. Cl. ............................................. 301/58
[51] Int. Cl.² ........................................ B60B 1/02
[58] Field of Search ................ 301/5 R, 9 R, 9 SB, 301/55–61, 66–72, 73–75, 79–81, 95–98, 104, 105 R, 105 B; 29/159 R, 159.01, 159.02, 159.03

[56] References Cited
UNITED STATES PATENTS

| | | | |
|---|---|---|---|
| 2,014,751 | 9/1935 | van Ranst | 301/9 SB |
| 2,937,905 | 5/1960 | Altenburger | 301/58 |
| 2,977,153 | 3/1961 | Mueller | 301/97 |
| 3,008,770 | 11/1961 | Mueller | 301/58 |

*Primary Examiner*—Stanley H. Tollberg
*Attorney, Agent, or Firm*—William Kovensky

[57] ABSTRACT

Automobile wheel with wire spokes accessible through a recess in the outer spoke band adjacent the drop center of the rim, thus permitting use of tubeless tires.

16 Claims, 7 Drawing Figures

WIRE WHEEL

This application is a continuation-in-part of U.S. Pat. applications Ser. Nos. 519,096, filed Oct. 30, 1974 and now abandoned and 521,705, filed Nov. 7, 1974.

This invention relates to a wire spoke wheel, particularly the center thereof, which is made in such manner that, after being fixed in a conventional rim, the resulting wheel can be used with conventional tubeless tires.

Wire spoke automobile wheels are old in the art. However, so far as I am aware, prior to the present invention none existed which permitted the use of tubeless tires in a practical way. In prior wire wheels the termini of the spokes at the wheel rim were generally positioned in holes in, for example, the drop center of the rim. This prevented an air-tight seal. Attempts to cover such spoke-rim assemblies with sealant strips on the interior of the rim have been uniform failures. At best, they develop leaks and at worst require complete removal of the tire to adjust or replace a spoke. Yet, some type of practical access to the spoke-heads is necessary because the wire spokes become loose or damaged and thus their tension must be adjusted, or the spokes have to be replaced altogether. The instant invention permits this by access to the spoke nipple by means of a recess between the drop center and the flange of the outer band holding the nipple, as will be explained in more detail hereinafter.

BRIEF DESCRIPTION OF THE DRAWINGS

In the figures,

Referring now to FIG. 1 an outer tire rim is shown generally at 2. The outer band of the spoke center assembly is shown at 4. The hub piece is shown generally at 6. A hub cap, 8, covers the central hub shell. Four types of wire spokes connect the outer band to the hub assembly. These are shown by way of example as follows: An upper front spoke is shown at 10; a lower front spoke is shown at 12; an upper back spoke is shown at 14; a rear back spoke is shown at 16. It will be noted that spokes are omitted in the lug bolt areas, to facilitate ready mounting and dismounting of the wheel. As shown in FIG. 1 there are 70 spokes in all. This number is by no means critical. The spokes are connected to the outer band through an outer spoke hole 20 and pierced spoke dimple 18. The spokes are connected to the hub piece 6 by way of inner spoke holes as shown for example at 22. Although lug nuts do not form any part of this invention, the wire wheel as shown in FIG. 1 shows 5 lug nuts 24 to show their position. Each lug nut is accompanied by a lug bolt washer 26. The spoke nipples are shown as for example at 28. The rim drop center is shown at 30. The drop center is conventional, and permits ready mounting of a tubeless tire onto the rim.

FIG. 2 shows various of the aforementioned features of FIG. 1, and in addition shows nipple head 36, in the outer band 4. At 38, is shown the outer band weld bead. At 40 is shown the interior hub cap retainer cap. There are five bolt holes, 42, shown without lug bolts or nuts. At 44 is shown the three screws for retaining the internal hub cap cup. At 46 is shown the hub mounting ring.

Turning now to FIG. 3, this figure shows a number of the features of FIG. 1 and FIG. 2, and in addition shows the hub mounting ring weld bead at 48, hub back flange 50, hub front flange 52, front tire bead seat 54, and rear tire bead seat 56.

FIG. 3 is in general a section of FIG. 1, as already noted. However, to show the maximum number of features with maximum clarity, all spokes have been omitted except 4 at the top of the figure and 4 at the bottom.

Figure 1:
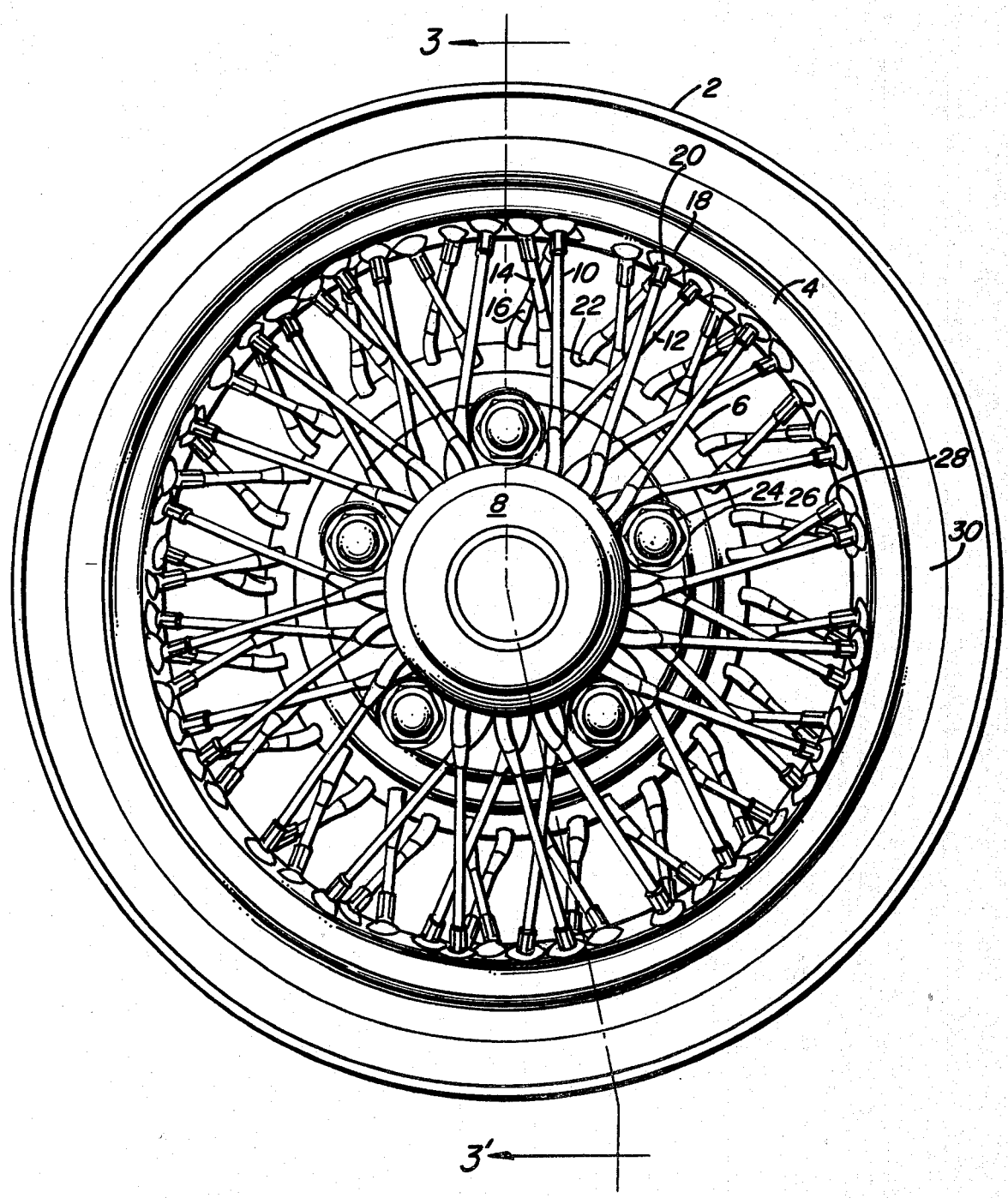
FIG. 1 shows the front face of the complete wire wheel of this invention.
Figure 2:
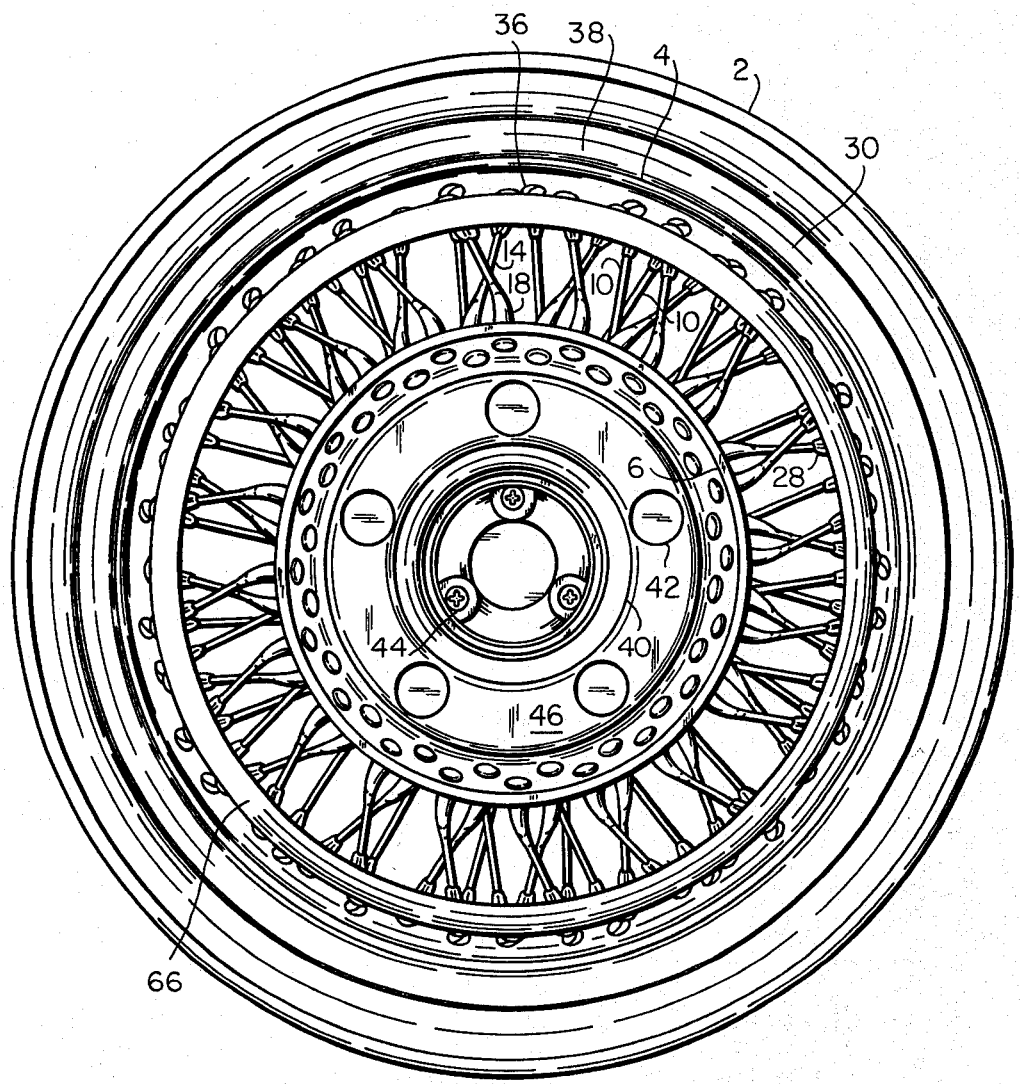
FIG. 2 shows the reverse side.

The wheel center of this invention is made in the following manner.

The Outer Band and Hub

The material used for the first draw operation is suitably a piece of strip stock (hot rolled steel, pickled in oil), 16 inches by 16 inches, and 0.168 inch thick. In the first forming operation, this blank is formed into a so-called "hat blank", being a circular shape about 13¼ inches in outer diameter with an inside diameter of about 11 inches, a lip of about 1⅛ inches, and a "hat" recess of about 1¼ inches. This initial shape resembles a shallow pan. In the next step the center area is blanked out, i.e., punched or cut out, to yield an outer band with an outer diameter of 12.260 inches and internal diameters ranging from about 11 inches at its widest to about 10¼ at the "foot" of the band; and an inner hub piece having an outer diameter of about 8 inches. In this operation the hub section is simultaneously given a deep draw to provide a "proto" hub 5⅝ in diameter and 2¼ inches deep. In a second forming step the hub diameter is reduced to about 4 inches and it becomes deeper. In a third step the hub is given its final contours.

In subsequent shaping operations about ¼ inch of metal is trimmed from the periphery of the outer band, which is then given a rough "S" cross-sectional shape by folding in the periphery to form an outer flange. (In this connection, note that the terminus of the outer band flange 58 is spaced sufficiently forward to permit ready access of the dimpling device to the outside of outer band 4.) This "S" shape comprises flange 58, then a generally radially disposed and somewhat axially inwardly disposed portion 62, then a generally axially disposed portion 64 which carries the spokes, and finally a radially inwardly extending flange portion 66. As shown, portion 64 will flex somewhat in use. The same advantage is also present in the second embodiment shown herein. The outer band 4, on receiving this configuration, is now ready for polishing. The interior of the outer band 4 is polished to provide a suitable surface for subsequent electroplating. It is then ready for dimpling and piercing.

Dimpling can be done by a hand-dimpling device, which is a hydraulically operated machine carrying a piston terminated by a hemisphere of ¾ inch radius. This hydraulic dimpler, operating at about 23,000 psi, forces spherical recesses (0.140 inch interior depth, about 7/16 inch diameter and 0.340 inch above the surface as viewed from the interior wall 60), into the outer periphery of the outer band, at periodic intervals. These recesses are then drilled or pierced at the appropriate complex angle so that they can receive the nipple of the wire spoke during a subsequent assembly operation. The outer spoke holes 20 are 5/16 inches diameter. They are larger than the inner holes 22 because they must accommodate the spoke nipples 28.

After dimpling and piercing, the outer band 4 is given a second, finishing polishing, to remove any die and scuff marks. It is then ready for plating.

Figure 3:
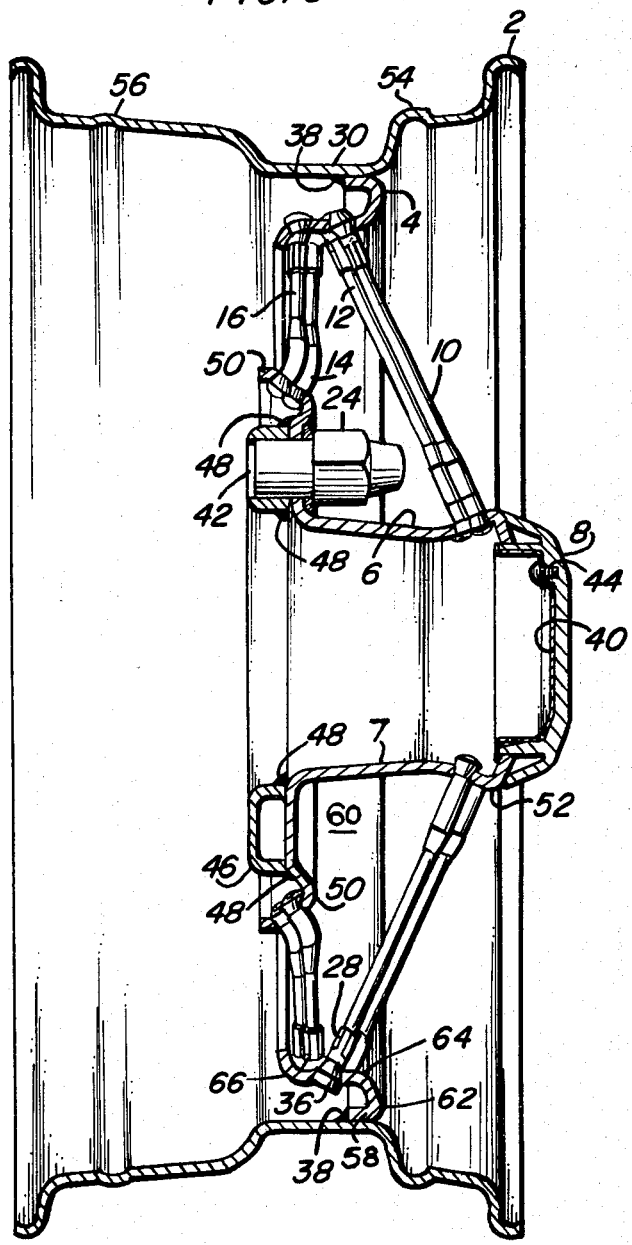
FIG. 3 shows a section of FIG. 1 taken along the lines 3-3'.

Returning now to the hub section, this section is formed with the section profile as shown in FIG. 3. Several different forming operations are used in achieving this profile.

First, as already mentioned, a large hat section is drawn, whereby the hub shell 7 is formed in basic outline. This is further drawn and refined in 2 subsequent operations, giving the shell in its final form, and with the bottom area of the hub blank still substantially flat. Next the hub center is blanked out (i.e., punched out). Then the hub shell is flared and the lug holes 42 are pierced and coined. Then the front of the hub is given the reverse angle as shown in FIG. 3 to form the flange 52. While these forming operations are in progress, the back flange 50 is being developed. I use three die operations to form this flange. This completes the drawing and forming operations for the hub piece 6, and the spoke holes are now drilled in it. It will be noted that the hub piece 6 must be drilled in its front flange 52 to accommodate the front spokes and at its back flange 50 to receive the back spokes. The holes are 0.218 inches diameter and are countersunk (0.281 in. diameter, wide end) to facilitate seating the spoke feet as hereinafter described. All of these drilling and countersink operations can be done conveniently by hand. Or, the holes may be pierced and coined using automatic or semi-automatic equipment.

A hub mounting ring is drawn with an annular section, as shown at 46. A ring is blanked from strip stock, 7½ inch square, 0.140 inch thick. Then the ring is drawn into a recessed annulus having the cross section shown, and simultaneously holes are pierced for the lug nuts. These operations can be done by hand or in a die press. The finished ring 46 is then welded to the rear of the hub piece 6 as shown in FIG. 3. The hub mounting ring has the function of providing additional support for the lugs. The hub piece 6 is then descaled to remove scale resulting from the welding operation, and then the front areas are polished.

Next, the hub assembly 6 and the outer band 4 are electroplated using conventional nickel/chromium electroplating techniques. A "collector" may be used to improve electroplating of the lug recesses.

The Double Flange Embodiment

Figure 4:
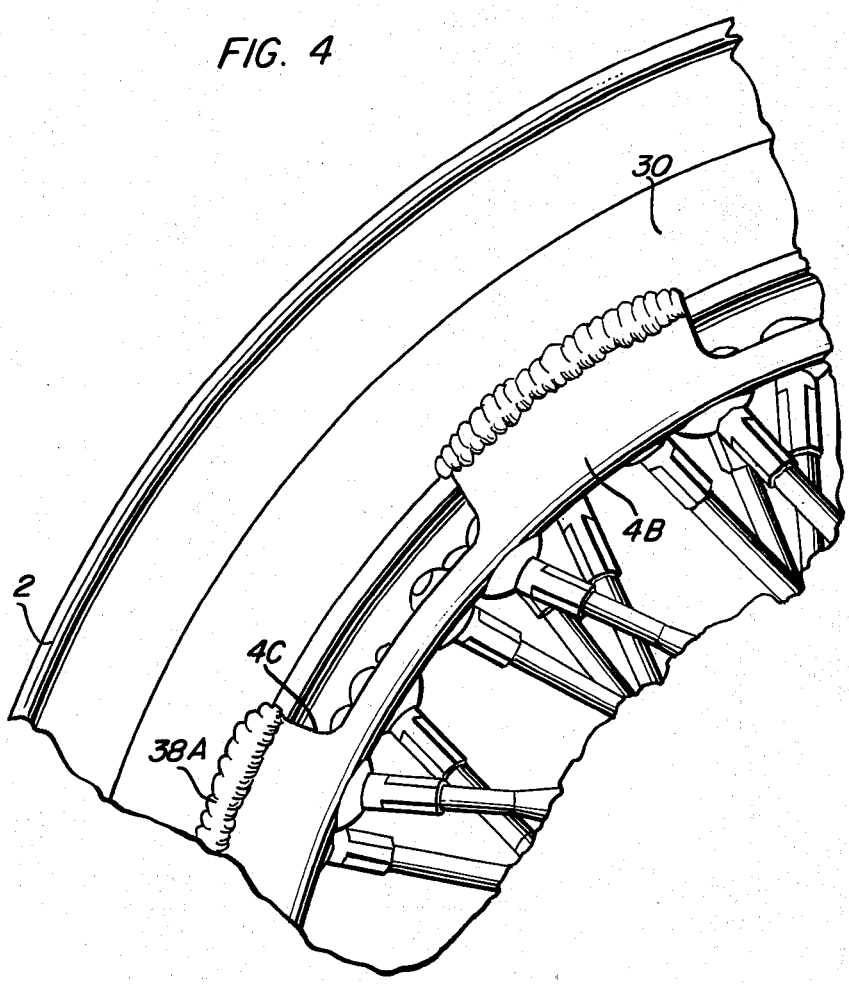
FIG. 4 is a partially cut-away view of the reverse side of an alternative embodiment.
Figure 5:
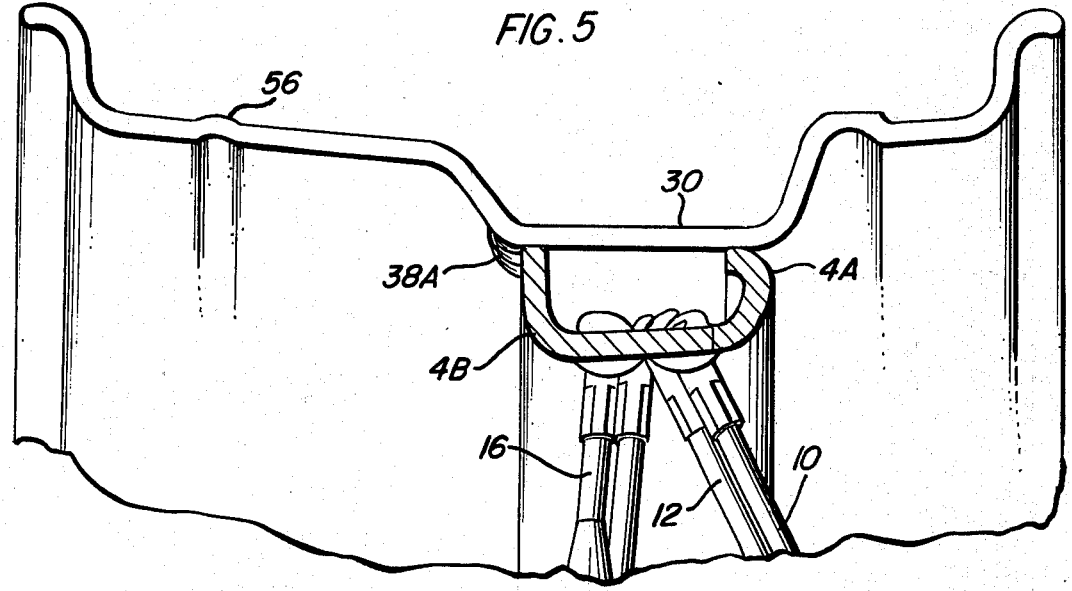
FIG. 5 is a section view similar to FIG. 3 showing the alternative embodiment partially cut-away.
Figure 6:
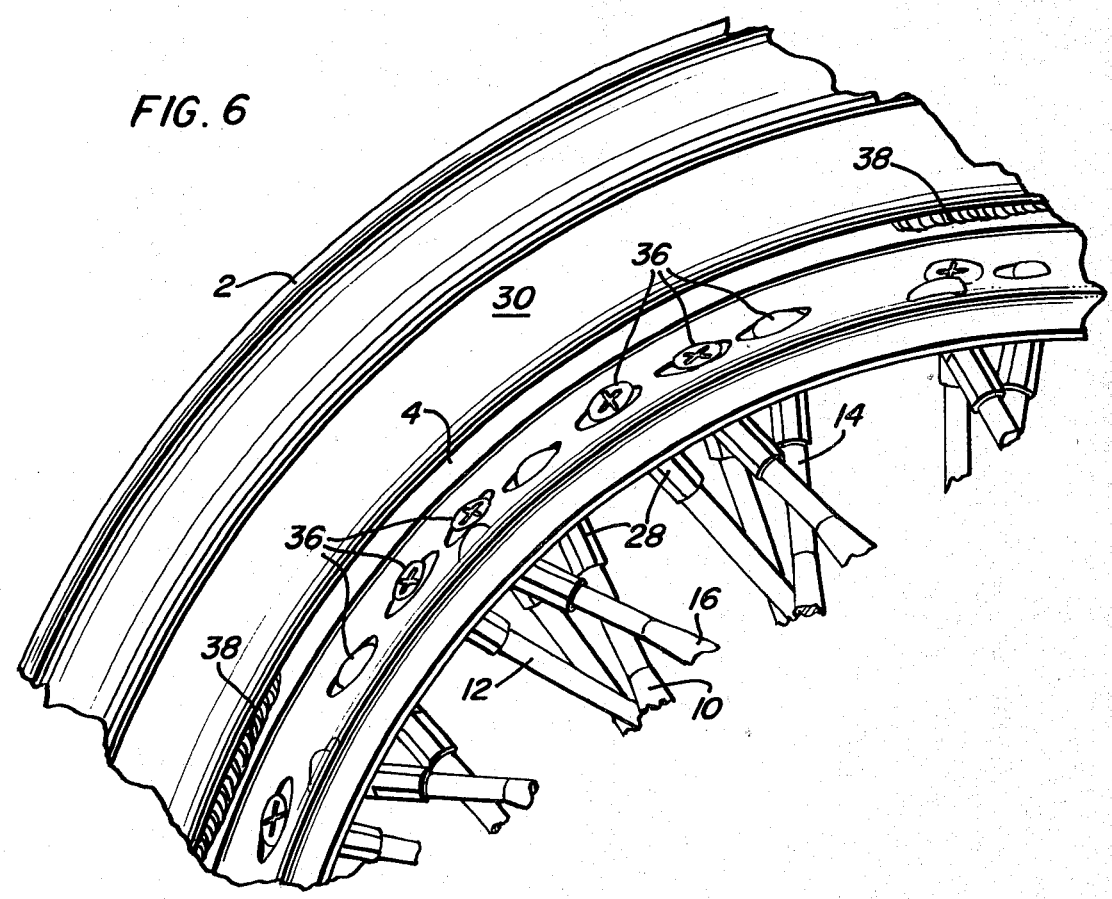
FIGS. 6 and 7 are enlarged views of FIGS. 2 and 3, respectively, each being partially cut away to show details of construction.
Figure 7:
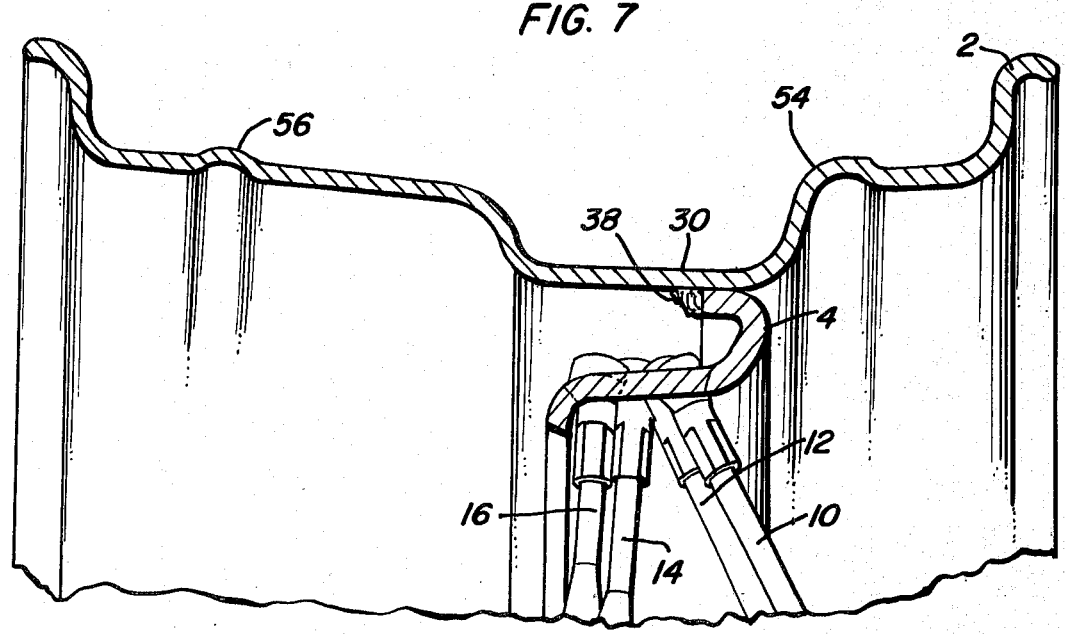

Referring now to FIGS. 4 and 5, an alternative embodiment is shown wherein the annular outer band 4 is provided with a double flange feature for mounting on the tire rim. The front flange portion 4A is formed in a manner similar to that shown in FIG. 3, and is adapted to fit against the interior edge of drop center 30. A second flange portion 4B is formed on the reverse side of band 4. The second flange is provided with spaced-apart cut-out portions 4C to permit access to the spoke nipples through the reverse side of the wheel without demounting the tire. The outer band 4 is welded to the tire rim center drop 30 joining the rear flange portion 4B with welds 38A.

The Spokes

The spokes and spoke nipples are of conventional size and configuration and are available commercially. These spokes are swedged, with rolled threads. The upper and lower front spokes (10 and 12) are 4¼ inches long. The upper back spokes (at 14) are 2⅛ inch long, and the rear back spoke (at 16) is 2¼ inches. These three measurements are overall, i.e., across. All the spokes have a diameter of about 0.200 inches in the main body and about 0.175 inches in the swedged portion. The spoke nipples are conveniently headed to fit a Phillips screwdriver. This facilitates tightening with power screwdrivers with torque fittings.

After the hub assembly 6 and the outer band 4 are electroplated they are then assembled. This is done in the following manner: The hub piece 6 and the outer band 4 are fastened in a fixture, which holds each in the proper final concentric fixed position with respect to the other. The back spokes 16 and 14 are then passed through the holes in the hub piece 6. Nipples 36 for the back spokes are passed through the corresponding holes in the outer band, and tightened up to a torque of about 5-10 inch pounds. Similar operations are then carried out for the front spokes. All of these operations can be done with simple hand tools. After the initial installation, each spoke is then further tightened to a torque of approximately 25-30 inch pounds. Following this to obtain best results and best seating, the assembly is vibrated. This results in settling and leveling out burrs and other marks within the spoke holes. After this the spokes are tightened again, e.g., up to a torque of about 50-75 inch pounds. If the spokes have been assembled properly, the wheel center should now have a tolerance of less than 0.030 inches for lateral run-out, i.e., misalignment in a plane perpendicular to the center axis as well as for radial run-out, i.e., misalignment or eccentricity in the center axis.

Grinding the Center

The center, which is now semi-assembled, is placed in a truing apparatus and machined to a true radius. The truing apparatus can be a lathe or a milling machine or grinder. For this operation the center is mounted by lug bolts to a fixture. At this point the outer band 4 is slightly oversize, and it is machined to a true circle by machining off material from the periphery of the band to give an oversize of 0.010 inch (oversize with reference to the rim in which the center is to be mounted). Such oversize will give a tight fit when the center is forced into the drop center of a standard wheel rim. After the center is forced into the rim (by automatic press or by hand alignment), it is checked and adjusted again for lateral run out. Following this it is finally welded to the wheel rim, by hand, or preferably using a short arc semi-automatic welding machine. The wheel is cleaned, then painted on the back side to cover the weld burn.

A hub cap 8 is conveniently mounted as shown, to help keep road grime out of the interior of the hub. This hub cap 8 can be readily detached by unscrewing the three screw at 44, thereby loosening the retaining cup 40. The retaining cup 40 can be removed then through the rear of the hub shell, thereby releasing the hub cap 8.

At a later time, if the wheel is damaged in use and requires realignment, it can be realigned by the standard procedure used for all automobile spoke wheels, i.e., the spokes can be tightened or loosened with an open end wrench. Also, unlike prior art tube-tire wire wheel spokes in my wheel spokes can be removed and replaced without removing the tire.

My invention can be used to make wheel centers of different sizes. For example, simply by making the portion 62 radially larger, I have been able to make a 15-inch center. The center remains in all respects identical to the 12.370 inch center above described except with a larger outside diameter preferably 12.680.

| Some Dimensions of Finished Center | | |
|---|---|---|
| Overall diameter (of outer band) | 12.370 | inches |
| Hub crown diameter | 3-5/8 | " |
| Depth of hub (without hub cap but including mounting ring) | 3-5/8 | " |
| Depth of hub back flange | 11/16 | " |
| Outer band, greatest internal diameter | 11-1/4 | " |
| Outer band, smallest internal diameter | 10-7/16 | " |
| Depth of outer band | 1-7/16 | " |
| Average metal thickness | 5/32 | " |

The above dimensions are not critical; they merely exemplify a preferred working embodiment of this invention.

What is claimed is:

1. A wire spoke wheel center structure separate from and adapted to be mounted in an automotive tubeless tire rim, the combination comprising an outer band, a hub concentrically located within said band, wire spokes interconnecting said band and said hub; said outer band comprising a radially outermost portion adapted to be affixed to the drop center of an automobile tubeless tire rim, a generally radially disposed front portion extending radially inwardly with respect to from said outermost portion, a generally axially disposed portion extending rearwardly from said front portion of said band, and said axially disposed portion being formed with openings; a wire spoke nipple disposed in each of said openings and cooperating with the outer ends of said spokes, and all of said wire spoke nipples being accessible from the rear side of said wire spoke wheel center on the radial inside of said band axially disposed portion when said center is mounted in an automotive tubeless tire rim.

2. The combination of claim 1, said outermost portion comprising an axially inwardly extending flange portion, said outer band axially extending portion being positioned in radially inwardly spaced relationship to said flange portion and extending axially rearwardly beyond said flange portion, whereby to facilitate said access to said nipples and whereby an annular recess opening from the rear of said center is defined by said band front portion and said axially extending portion in combination with the juxtapositioned portion of a rim drop center when said center is mounted in said rim.

3. The combination of claim 2, said outer band comprising a flange portion extending radially inwardly from the inner end of said axially extending portion, whereby said outer band is of a generally "S"-like configuration in cross section.

4. The combination of claim 1, said outer band comprising a rear flange extending generally radially outwardly from the inside end of said axially disposed portion and in generally spaced relation to said front portion, and a plurality of cut-out portions formed in said rear flange to permit access therethrough to the back ends of said spoke nipples.

5. The combination of claim 4, and a tubeless tire rim, and weld means joining the uncut-out portions of said rear flange to the drop center of said rim, whereby said wire spoke center together with said rim constitute an automotive wire wheel.

6. The combination of claim 1, said outermost portion comprising an axially rearwardly relatively short flange portion adapted to be welded to the drop center of an automotive rim in which said center is mounted, and a flange portion extending radially inwardly from the inner end of said axially extending portion, whereby said outer band is of generally "S"-like configuration.

7. The combination of claim 1, in further combination with an automotive tubeless tire rim, and means to join said outer band outermost portion to the drop center portion of said rim at a predetermined location therein.

8. The combination of claim 7, said outermost portion comprising an axially rearwardly extending flange portion, and said means to join further comprising weld means joining said flange portion to said rim drop center.

9. The combination of claim 1, in which the front surfaces of said outer band, all of said nipples, all of said spokes, and the front surfaces of said hub, are all nickle/chromium plated.

10. The combination of claim 1, said axially disposed portion of said outer band being formed with a plurality of radially inwardly extending dimples and said openings being pierced through said dimples at predetermined angles corresponding to the angular orientations of said spokes and nipples in said wheel center.

11. The combination of claim 10, said hub being formed with five lug bolt holes, said wire spokes comprising front spokes and rear spokes, said front spokes being arranged in five groups of six spokes each and so as to permit access for a tool between said groups to lug nuts mounted on wheel mounting bolts extending through said lug bolt holes in said hub, whereby said front spokes total thirty in number.

12. The combination of claim 11, said rear spokes being arranged in pairs and extending from the rear part of said hub to said outer band, said rear spokes comprising twenty such pairs, whereby the spokes in said wire wheel center total seventy in number.

13. A method of making an automotive wire wheel center comprising the steps of:
 a. forming an outer band having an axially extending portion which will be positioned in spaced relation to the juxtaposition portion of an automotive tubeless tire rim when said center is mounted in such rim, said outer band also having a front radially disposed portion at the front end of said axially extending portion;
 b. forming spoke holes in said axially extending portion;
 c. forming a hub having a front portion and a rear portion with spoke holes in said front and rear portions;
 d. positioning the hub concentrically within the outer band;
 e. inserting spoke nipples through the spoke holes in the outer band;
 f. installing spokes through the spoke holes in the hub;
 g. connecting the radial outer ends of the spokes to the spoke nipples;

h. tightening the spoke nipples to a preliminary uniform torque to provide a preliminary adjustment of the lateral and the radial run-out of said wire wheel center; and i. machining the outermost portion of said outer band to a radial run-out acceptable when said center is mounted in a rim to make an automotive wire wheel;

whereby hand tuning of said spokes is avoided.

14. The method of claim 13, forming radially inwardly extending dimples in said axially extending portion of said band, and thereafter performing said step (b) with said holes being respectively positioned in their dimples at locations corresponding to the angular orientations of said spokes in said wheel center.

15. The method of claim 13, pressing the center into an automobile tubeless tire rim, adjusting the position of said center within said rim to minimize lateral run-out, and welding the outermost portion of said center outer band to said rim drop center portion to form said wire wheel.

16. The method of claim 13, and plating the outer band front surfaces, the hub front surfaces, the nipples, and the spokes, with nickle and chromium prior to assembling said parts into said wire wheel center.

* * * * *

UNITED STATES PATENT AND TRADEMARK OFFICE
CERTIFICATE OF CORRECTION

PATENT NO. : 3,993,357
DATED : November 23, 1976
INVENTOR(S) : Merlyn R. Reppert It is certified that error appears in the above-identified patent and that said Letters Patent are hereby corrected as shown below:

Claim 1, line 10, change "from said outermost portion, a generally axially dis-" to --said outermost portion, a generally axially dis---.

Signed and Sealed this

Twenty-sixth Day of April 1977

[SEAL]

Attest:

RUTH C. MASON
Attesting Officer

C. MARSHALL DANN
Commissioner of Patents and Trademarks